United States Patent Office 2,772,290
Patented Nov. 27, 1956

2,772,290
PREPARING PYROCATECHIN-SULFON-PHTHALEIN

Zdeněk Vodák, Prague Smichow, and Otakar Leminger, Usti n Labem, Czechoslovakia

No Drawing. Application May 25, 1954,
Serial No. 432,306

Claims priority, application Czechoslovakia
November 13, 1953

8 Claims. (Cl. 260—327)

This invention relates to a new method of preparing pyrocatechin-sulfonphthalein for use as a universal complexonometric indicator.

The determination of various metals by titration with solutions of complexons, and the use of certain organic dyestuffs as indicators constituting a modern analytical method which offers numerous advantages. For this kind of analysis, pure crystalline pyrocatechin-sulfonphthalein has proved to be a particularly advantageous indicator for both acid and alkaline media.

Only very few references to pyrocatechin-sulfonphthalein can be found in the chemical literature. Moir (J. Sc. Afr. Assoc. Anal. Chem. 3, 6, 1920; C. A. 14, 3607, 1920) and Cyrus B. Wood (J. Am. Chem. Soc. 52, 3463–4, 1930; C. 1930, II, 2379) prepared this compound by condensation melting the symdichloride of o-sulfobenzoic acid with pyrocatechin, if necessary with the addition of $ZnCl_2$ as a condensing agent, at temperatures of from 90° to 165° C. The product thus obtained is amorphous, hygroscopic, dark-red to black, softens on heating, and melts at 60° C. However, the authors succeeded neither in recrystallizing this raw product nor in arriving at a pure crystallized state. It is possibly for this reason that the referred to authors have been unable to report on results as far as chemical analysis is concerned. From papers published on their work in this respect, it is obvious that the authors endeavored in vain to obtain a pure compound so that their data as to the properties and color changes of pyrocatechin-sulfonphthalein cannot be regarded as dependable.

The primary object of our invention is to provide an improved method of preparing pyrocatechin-sulfonphthalein.

More specifically, our invention aims at a method of preparing pyrocatechin-sulfonphthalein, which will embody commercially and scientifically most desirable advantages, such as a simple and easy performance, and the yield of a chemically pure end product.

Other objects of the present invention will become apparent from the following description.

Our present invention makes it possible to obtain pure pyrocatechin-sulfonphthalein in a crystalline state by condensing (melting) the anhydride of o-sulfobenzoic acid with pyrocatechin at temperatures of from 80° to 130° C. in accordance with the following equation:

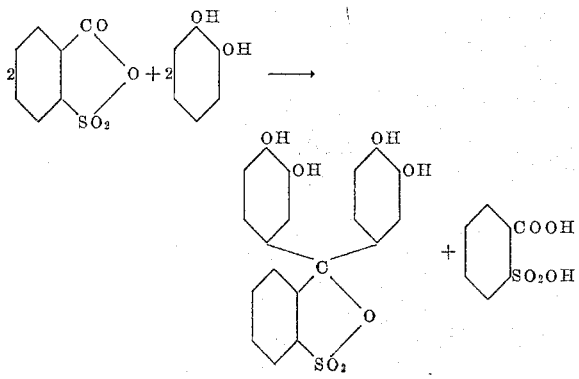

According to another feature of the present invention, the melted product thus obtained is further treated in either of the following ways:

(1) The product is diluted with glacial acetic acid which dissolves impurities and by-products and, after draining, leaves a relatively pure pyrocatechin-sulfonphthalein.

(2) The melted product is diluted with water and the pH-value of the solution is brought to about 4 by addition of soda. The solution is then subjected to extraction by a suitable polar solvent which does not mix with water, preferably n-butanol. The extract is separated from the aqueous layer, and upon distilling off the solvent, raw pyrocatechin-sulfonphthalein is obtained which is further purified by being covered with glacial acetic acid or by being recrystallized from ethanol.

Pure recrystallized pyrocatechin-sulfonphthalein forms green prismatic crystals having a metallic lustre. After crushing, the compound forms a yellowish powder which is highly soluble in water, $NH_3$-solution, hot ethanol, or hot glacial acetic acid, less soluble in cold ethanol or cold glacial acetic acid. Pyrocatechin-sulfonphthalein is a typical dyestuff-indicator, changing its color in aqueous solution with the change of the pH-value. Its diluted aqueous solutions are yellow, more strongly acid solutions are red, alkaline solutions are intensely violet, turning brown after a certain period. Pyrocatechin-sulfonphthalein forms at different pH-values of aqueous solutions with certain metals (Bi, Th, Ni, Co, Ca, Mg, Ba) intensely blue stable complexes. This phenomenon is utilized as an indication for the volumetric analysis of the aforesaid metals by means of complexons, the blue metal-complex solutions being titrated with the complexon solution to discolorization.

The following examples are given to illustrate the present invention without, however, limiting its scope.

Example 1

22 parts by weight of pyrocatechin and 37 parts by weight of o-sulfobenzoic acid anhydride are melted for about 90 minutes at a temperature of from 100° to 110° C. while being stirred. A dark-colored thick melted product with a violet, metallic lustre is obtained. At the same temperature, 105 parts by weight of glacial acetic acid are slowly added. While steadily being stirred, the mixture is allowed to cool to a temperature of 20° to 25° C. The crystals formed are drained off and washed with 52 parts by weight of glacial acetic acid which is added gradually. The pyrocatechin-sulfonphthalein is obtained in a relatively pure state and can be further refined by recrystallizing, e. g., from hot ethanol. After such purification, 13.3 parts by weight of pyrocatechin-sulfonphthalein are obtained, i. e., 34.5% of the theoretical value calculated on pyrocatechin used.

Example 2

The melted condensation product can be treated in another way, namely, by diluting it with about 75 weight parts of water (instead of glacial acetic acid). The solution thus obtained is adjusted to a pH-value of about 4 by adding soda, then shaken several times with about 80 weight parts of n-butanol. The successive butanol extracts are separated from the water layer, and freed from the solvent by distilling with steam. The remaining aqueous solution of the dyestuff is thickened for crystallization purposes. The crystals of raw pyrocatechin-sulfonphthalein are further refined by being covered with glacial acetic acid, or by being recrystallized from ethanol.

It is believed that the general method and the specific examples of our invention, as well as the advantages thereof, will be apparent from the foregoing description. It will also be apparent that while we have shown and described preferred examples of our invention, changes may be made without departing from the spirit of the invention, as sought to be defined in the following claims.

We claim:

1. Method of preparing pure crystalline pyrocatechin-sulfonphthalein, comprising condensing o-sulfobenzoic acid anhydride with pyrocatechin by melting said compounds in equimolar proportions at temperatures substantially between 100° and 110° C., the condensation taking place according to the following equation:

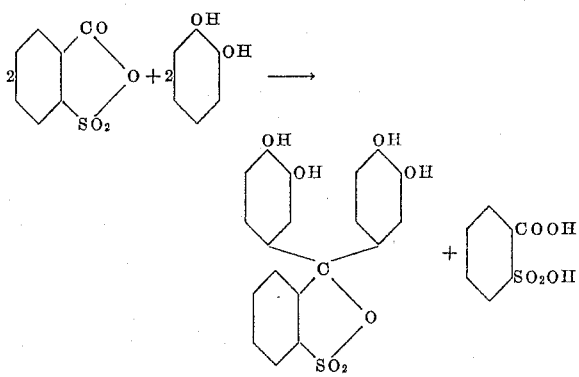

and purifying the raw pyrocatechin-sulfonphthalein obtained by causing the condensation product to crystallize, subjecting the crystals to recrystallization, and using glacial acetic acid for washing purposes.

2. In the method according to claim 1, diluting the hot melted mass with glacial acetic acid, cooling to effect crystallization of the condensation product, separating the latter, washing same with glacial acetic acid, and recrystallizing the crystals from hot ethanol.

3. In the method according to claim 1, diluting the hot melted mass with water, adjusting the solution to a pH-value of 4 by adding soda, extracting by means of a polar solvent nonmixable with water, evaporating the solvent, thickening the remaining aqueous solution until crystallization takes place, and purifying the crystals obtained.

4. In the method according to claim 3, extracting with n-butanol.

5. In the method according to claim 3, evaporating said solvent by aqueous steam distillation.

6. In the method according to claim 3, purifying said crystals by washing same with glacial acetic acid.

7. In the method according to claim 3, purifying said crystals by recrystallizing same from ethanol.

8. Complexonometric indicator consisting of pyrocatechin-sulfonphthalein in a pure crystalline state.

References Cited in the file of this patent

UNITED STATES PATENTS

| | | |
|---|---|---|
| 1,786,611 | Harden | Dec. 30, 1930 |
| 2,382,730 | Lieber | Aug. 14, 1945 |

OTHER REFERENCES

Moir, C. A. 14:3607 (1920).
Orndorff, J. A. C. S., 46:1896–1912 (1924).